No. 803,845. PATENTED NOV. 7, 1905.
C. E. NEAL.
TRANSMISSION GEARING.
APPLICATION FILED MAR. 30, 1905.
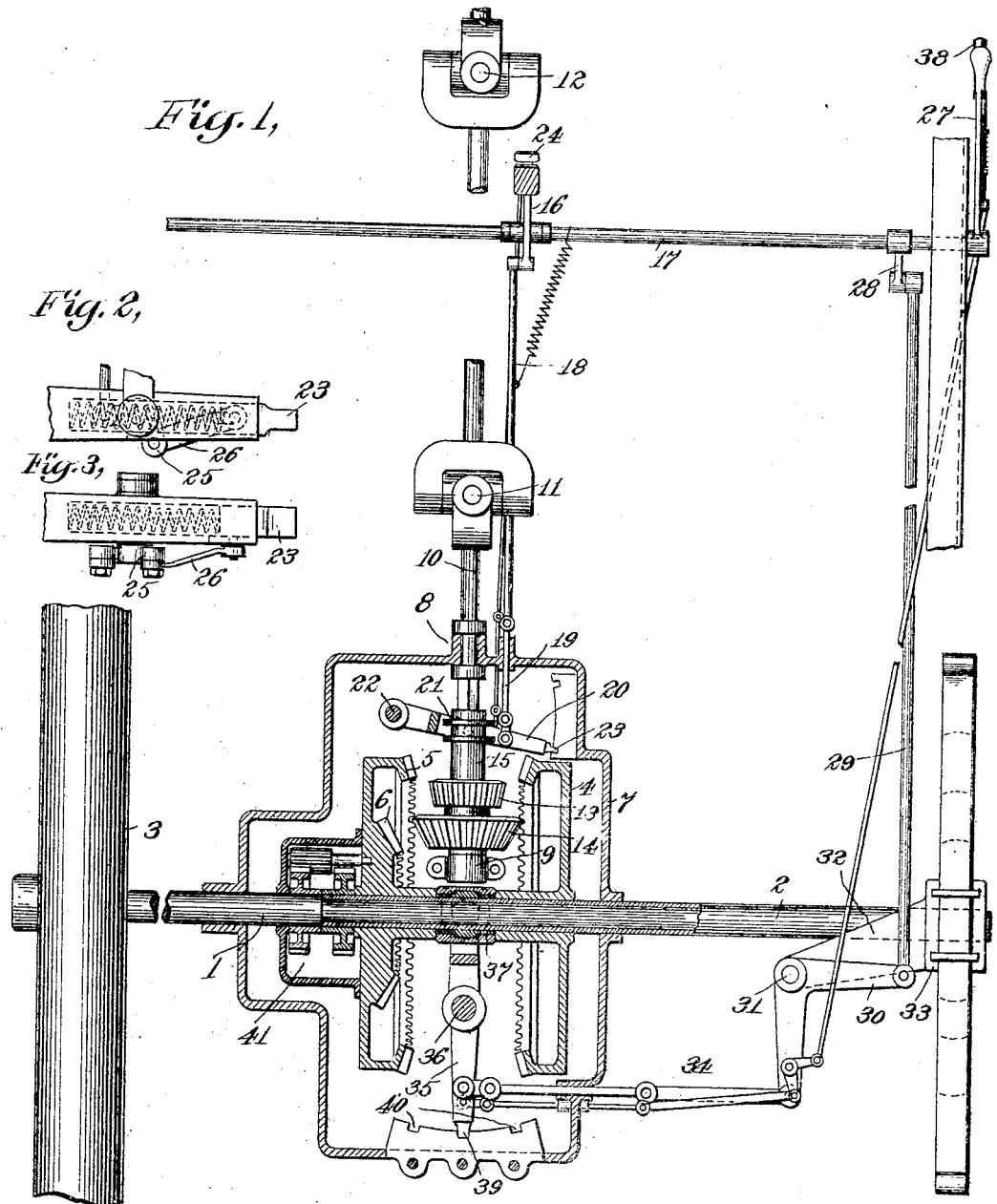
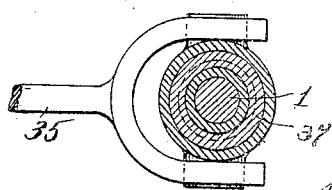
WITNESSES:
C. F. Carrington
C. L. Hall
INVENTOR
Charles E. Neal
BY
Chapin, Raymond & Marble
HIS ATTORNEYS

UNITED STATES PATENT OFFICE.

CHARLES E. NEAL, OF NEW YORK, N. Y.

TRANSMISSION-GEARING.

No. 803,845.        Specification of Letters Patent.        Patented Nov. 7, 1905.

Application filed March 30, 1905. Serial No. 252,800.

*To all whom it may concern:*

Be it known that I, CHARLES E. NEAL, a citizen of the United States of America, and a resident of the city, county, and State of New York, have invented certain new and useful Improvements in Transmission-Gearing, of which the following is a specification, reference being had to the accompanying drawings, forming a part thereof.

My invention relates to transmission-gearing, and particularly to change-speed and reverse mechanism for motor-vehicles.

My invention consists in certain improved mechanism comprising driving and driven gears arranged to move toward and away from each other in directions both longitudinal and transverse of the axis of rotation of the driving-gear, together with certain improved operating mechanism therefor and positive locking means for locking the parts in their adjusted positions.

The objects of my invention are to simplify and improve gearing of this character, render the adjusting movements positive and direct, make it impossible to lock up the gearing by an improper manipulation of the operating mechanism, reduce the size and number of the parts, and provide for the positive locking of the parts against accidental movement when once adjusted.

I will now proceed to describe transmission-gearing embodying my invention and will then point out the novel features in claims.

In the drawings, Figure 1 is a top view, partially in horizontal section, of transmission-gearing embodying my invention, showing certain portions of the running-gear of a motor-car with which the said gearing is connected. Figs. 2 and 3 are detail views, respectively, in plan and side elevation, of a locking means employed. Fig. 4 is a detail view in section transversely through the driven shaft and parts connected thereto at a point about midway between the oppositely-arranged driven wheels.

The two-part drive-axle 1 and 2, of usual construction in a motor-vehicle, is herein illustrated, the shaft portion 1 secured to a drive-wheel 3 on one side of the vehicle and the shaft 2 secured to a corresponding drive-wheel on the other side of the vehicle. (Not shown.) The shaft portion 2 carries bevel-gears 4, 5, and 6, all secured together and to the shaft. The bevel-gears 4 and 5 face each other, while the bevel-gear 6 faces in the same direction as the bevel-gear 5. The bevel-gears 4, 5, and 6 I term herein the "driven" gears to differentiate them from the gears which drive them. The gears 4, 5, and 6 are inclosed in a gear-box 7, fitted to slide axially upon the shaft 1 2. This gear-box carries bearings 8 and 9, in which is rotatably mounted a driving-shaft 10. The said driving-shaft 10 includes universal joints 11 12, by which freedom of movement is permitted, as is common in automobile construction. Bevel driving-gears 13 and 14, secured together upon a sleeve 15, are mounted upon the said shaft 10, being secured against relative rotation thereof, but permitted to have axial or longitudinal movement with respect thereto. The longitudinal movement is effected by means of an operating-lever, here shown as a pedal 16, pivoted upon a transverse bar 17 and connected by means of links 18 and 19 with a shift-lever 20, provided with jaws engaging a flanged portion 21 of the sleeve 15. The lever 20 is pivoted at 22 to a portion stationary with the gear-box, and it will be readily understood that rocking the lever 16 upon its pivotal support will tend to vibrate the lever 20 to shift the driving-gears 13 and 14 longitudinally upon their shaft. I provide locking means for locking the lever in its adjusted position in a latch 23, carried by the lever 20 and operated by a latch-lever 24, adjacent the operating-lever 16. The latch-lever 24 is connected by suitable link connections to a bell-crank lever 25, (see particularly Figs. 2 and 3,) which bell-crank lever is connected by a link 26 to the latch 23, whereby the same may be withdrawn against spring tension.

In operating this device the latch-lever is first rocked upon its support to withdraw the latch 23 from the notch in a portion of the casing or gear-box 7 with which it is engaged, and the lever 16 is then rocked to shift the lever 20 from one position to another. After being so shifted the latch-lever 24 is released to permit the latch 23 to engage another notch, so that the driving-gears will be positively held in their adjusted position longitudinally with respect to the shaft 10.

Shifting the driving-gears 13 and 14 longitudinally upon the shaft will change them from a position with the driving-gear 14 opposite the driven gear 6 to a position with the driving-gear 13 opposite the driven gears 4 and 5. When the gear-box is in its intermediate position and in which position it is shown in the drawings, the driving-gears 13 and 14 will not engage any one of the driven gears, no matter what their position upon the shaft 10 may be, but when in one position or the other will be ready for engagement with the desired gear upon movement of the gear-box in one direction or the other. This will readily be understood when it is remembered that the gear-box carries the end of the shaft 10, on which the driving-gears 13 and 14 are mounted, so that laterally shifting the gear-box will also laterally shift the driving-gears 13 and 14 toward and away from the driven gears. The driven gears 5 and 6 are gears for forward driving, while the gear 4 is a gear for rearward driving. When the gear-wheel 14 is in engagement with the gear-wheel 6, the relationship of the two gears will produce high speed forward driving, and when the driving-gear 13 is in engagement with the driven gear 5 the relationship thereof will result in forward driving at low speed; but when the driving-gear 13 is in engagement with the driven gear 4 the result will be rearward driving at low speed.

For the purpose of shifting the gear-box I have provided an operating-lever 27, mounted upon the transverse shaft 17, said transverse shaft carrying a short arm or lever 28, connected by a rod 29 with a bell-crank lever 30, said bell-crank lever pivoted at 31 upon a support 32, which may conveniently extend from the clip 33, which supports one of the vehicle-springs, the bell-crank lever 30, connected by link connections 34 with a lever 35, pivoted upon a pin 36, secured to the gear box or casing. The shift-lever 35 has a forked end suitably fitted to a collar 37, carried by the shaft portion 2 and secured thereon against longitudinal movement. The collar 37 then acts as a fulcrum for the lever 35, the said lever shifting the box longitudinally upon the shaft 1 2 by reason of its pivotal connection therewith through the pin or stud 36.

The operating-lever 27 is provided with a latch-lever 38, which operates a latch 39, similar to the latch 33, above described, for the lever 20. The latch 39 is arranged to engage with notches 40 in a portion stationary with the gear-box, so that the gear-box may be positively locked in any position to which it is adjusted. When in its intermediate position, as shown in the drawings, the latch 30 engages the middle notch, and, as above set forth, the driving-gears 13 and 14 are then in their intermediate positions out of engagement with any of the driven gears. When the latch 39 is in engagement with either of the other notches, the gear-box will have been shifted to a position in which a driving-gear is in position for engagement with the selected driven gear. The advantage of providing the gear-box itself with the locking means is that thereby the gears once in mesh will be positively locked in such mesh without danger of their springing apart, as might occur were the locking means at some distance away and connected through intermediate mechanism.

The usual or any desired compensating gearing 41 is provided between the two shaft portions 1 and 2, as is common in automobile drive mechanism, so as to permit compensating movements between the two drive-wheels.

It will be seen that by my invention I have provided an exceedingly smooth, strong, and efficient change-speed transmission-gearing, composed of but few parts and those parts of such construction as to be unlikely to get out of order. All the movements are simple, positive, and direct, and, further, careless manipulation of the levers will not result in locking the mechanism up, as is common in many of the forms now in use.

What I claim is—

1. In transmission-gearing, the combination with gearing elements comprising driving and driven bevel-gears, the latter comprising a plurality of gears of different diameters upon the same shaft, of means for moving one of the said elements with respect to the other in directions both longitudinal and transverse of the axis of rotation of the driving-gear element.

2. In transmission-gearing, the combination with oppositely-disposed bevel-gears, and a bevel driving-gear arranged between them at right angles thereto, of a shaft for said driving-gear, means for moving said driving-gear longitudinally along said shaft, and means for moving said shaft and said gear laterally toward and away from the first said bevel-gears.

3. In transmission-gearing, the combination with a plurality of bevel-gears facing in the same direction and a bevel driving-gear arranged at right angles thereto, of a shaft for said driving-gear, means for moving said driving-gear longitudinally along said shaft, and means for moving said shaft and said gear laterally toward and away from the first said bevel-gears.

4. In transmission-gearing, the combination with a plurality of bevel-gears facing in the same direction, a bevel-gear oppositely disposed thereto, and a bevel driving-gear arranged between the said oppositely-disposed gears, of a shaft for said driving-gear, means for moving said driving-gear longitudinally along said shaft, and means for moving said shaft and said gear laterally toward and away from the first said bevel-gears.

5. In transmission-gearing, the combination with a plurality of bevel driven gears, and a plurality of bevel driving-gears arranged at right angles thereto, of a shaft for said driving-gears, means for moving said driving-gears longitudinally along said shaft, and means for moving said shaft and said gears thereon, laterally toward and away from the said driven gears.

6. In transmission-gearing, the combination with a plurality of bevel driven gears, a gear-box inclosing said bevel-gears, a shaft mounted in bearings in said box, and a bevel driving-gear mounted upon said shaft, of means for moving said driving-gear along said shaft, and means for moving said gear-box, with said driving gear and shaft, longitudinally of the axis of said driven gears.

7. In transmission-gearing, the combination with a plurality of bevel driven gears, a shaft therefor, a gear-box mounted to slide upon said shaft and inclosing said bevel-gears, a shaft mounted in bearings in said box at right angles to the first said shaft, and a bevel driving-gear mounted upon said last-named shaft, of means for moving said driving-gear longitudinally along the shaft upon which it is mounted, and means for sliding the gear-box longitudinally along its shaft.

8. In transmission-gearing, the combination with a driving and driven gears, of means for moving one with relation to the other in directions both longitudinal and transverse of the axis of rotation of the driving-gear, and positive locking means for locking the parts in the positions to which they are moved.

9. In transmission-gearing, the combination with a plurality of bevel driven gears, a gear-box inclosing said bevel-gears, a shaft mounted in bearings in said box, and a bevel driving-gear mounted upon said shaft, of means for moving said driving-gear along said shaft, means for moving said gear-box, with said driving gear and shaft, longitudinally of the axis of said driven gears, and a latch engaging said gear-box for positively locking same in the various positions to which it is adjusted.

CHARLES E. NEAL.

Witnesses:
D. HOWARD HAYWOOD,
C. F. CARRINGTON.